(12) United States Patent
Kim et al.

(10) Patent No.: US 12,457,297 B2
(45) Date of Patent: Oct. 28, 2025

(54) DETECTING OUTPUT ERROR USING INLINE SCANNER

(71) Applicant: Hewlett-Packard Development Company, L.P., Spring, TX (US)

(72) Inventors: Jihyo Kim, Pangyo (KR); Heesang Kwon, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 25 days.

(21) Appl. No.: 18/569,440

(22) PCT Filed: Dec. 2, 2021

(86) PCT No.: PCT/US2021/061545
§ 371 (c)(1),
(2) Date: Dec. 12, 2023

(87) PCT Pub. No.: WO2023/277940
PCT Pub. Date: Jan. 5, 2023

(65) Prior Publication Data
US 2024/0275889 A1    Aug. 15, 2024

(30) Foreign Application Priority Data
Jun. 30, 2021 (KR) .......................... 10-2021-0085984

(51) Int. Cl.
*H04N 1/04*    (2006.01)
*H04N 1/00*    (2006.01)

(52) U.S. Cl.
CPC ..... *H04N 1/00034* (2013.01); *H04N 1/00037* (2013.01)

(58) Field of Classification Search
USPC ................................................ 358/1.19, 3.26
See application file for complete search history.

(56) References Cited

U.S. PATENT DOCUMENTS

| | | | |
|---|---|---|---|
| 5,678,124 A * | 10/1997 | Tokura ................... | G03G 15/70 347/139 |
| 6,968,076 B1 | 11/2005 | Ouyang et al. | |
| 8,144,368 B2 | 3/2012 | Rodriguez et al. | |
| 8,564,834 B2 | 10/2013 | Lin et al. | |
| 9,254,693 B2 * | 2/2016 | Maeda ................. | B41J 13/0009 |
| 10,795,618 B2 | 10/2020 | Gutierrez et al. | |

(Continued)

FOREIGN PATENT DOCUMENTS

EP    3509286 A1    7/2019

*Primary Examiner* — Cheukfan Lee
(74) *Attorney, Agent, or Firm* — Brooks, Cameron & Huebsch, PLLC

(57) ABSTRACT

An example image forming apparatus that detects an error of an image formed on a printing medium, the apparatus includes a print engine, an inline scanner located at an output end of the print engine, and a processor. The processor is to obtain information of print data of a received print job, form an image on a printing medium based on the print data by using the print engine, obtain information of a print image of the printing medium on which the image is formed by using the inline scanner, detect whether normal output is performed by comparing the information of the print data with the information of the print image, and, in a case where the normal output is not detected, detect an output error and perform re-output.

13 Claims, 17 Drawing Sheets

(56) References Cited

U.S. PATENT DOCUMENTS

| | | | |
|---|---|---|---|
| 2008/0084020 A1* | 4/2008 | Nakamura | B41J 11/485 |
| | | | 271/259 |
| 2012/0014566 A1 | 1/2012 | Xu et al. | |
| 2012/0257917 A1 | 10/2012 | Bockus, Jr. et al. | |
| 2015/0078627 A1 | 3/2015 | Fukase | |
| 2018/0130192 A1* | 5/2018 | Yago | G01N 21/89 |
| 2018/0329352 A1 | 11/2018 | Yamashita | |
| 2019/0126651 A1* | 5/2019 | Terakado | B41J 29/38 |
| 2020/0186661 A1 | 6/2020 | D'Armancourt et al. | |
| 2022/0263963 A1* | 8/2022 | Aoyagi | H04N 1/00034 |
| 2022/0391151 A1* | 12/2022 | Matsuyama | G06F 3/1285 |

\* cited by examiner

FIG. 4

| (UNIT:mm) | STANDARD WIDTH | STANDARD HEIGHT | MARGIN | RANGE OF WIDTH TO BE SEARCHED | RANGE OF HEIGHT TO BE SEARCHED |
|---|---|---|---|---|---|
| A3 | 297 | 420 | 2 | 293~297 | 416~420 |
| A4 | 210 | 297 | 2 | 206~210 | 293~297 |
| A5 | 148 | 210 | 2 | 144~148 | 206~210 |
| Ledger | 279 | 432 | 2 | 275~279 | 428~432 |
| Legal | 216 | 356 | 2 | 212~216 | 352~356 |
| Letter | 216 | 279 | 2 | 212~216 | 275~279 |
| Statement | 140 | 216 | 2 | 136~140 | 212~216 |

FIG. 5

PRINTED MATTER ERROR CORRECTION

☐ TEMPLATE DETECTION
☑ REUSABLE PAPER DETECTION
☑ SHEET SIZE DETECTION

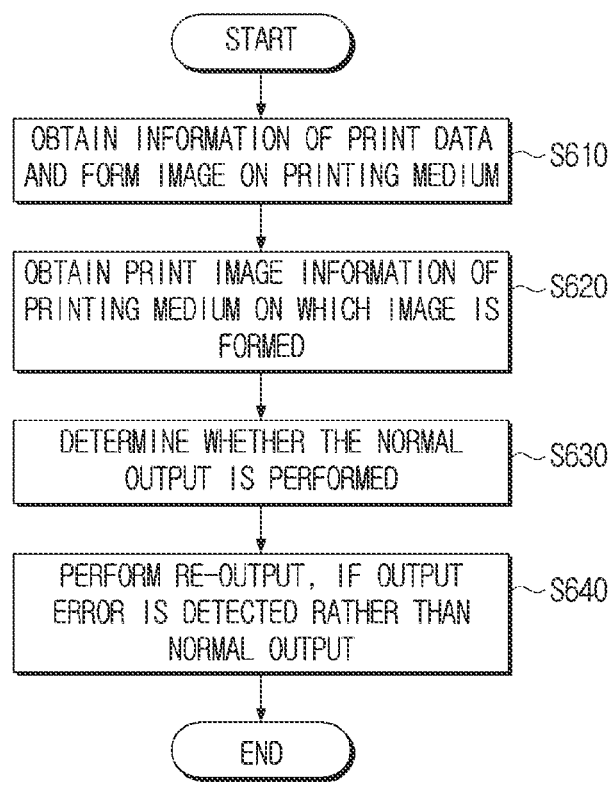

DETECTING OUTPUT ERROR USING INLINE SCANNER

BACKGROUND

An image forming apparatus may refer to an apparatus which prints print data generated on a terminal apparatus such as a computer on a printing medium such as paper. Examples of such an image forming apparatus may include a copier, a printer, a facsimile, a multi-function peripheral (MFP) serving functions of these in combination as one apparatus, and the like.

BRIEF DESCRIPTION OF THE DRAWINGS

Various examples will be described below by referring to the following figures.

FIG. 4 is a diagram illustrating information of a printing medium according to an example;

FIG. 5 is a diagram illustrating an option user interface (UI) for setting options for detecting normal output of an output document according to an example;

FIG. 6 is a flowchart illustrating an error detection method of an image according to an example;

DETAILED DESCRIPTION

Figure 1:
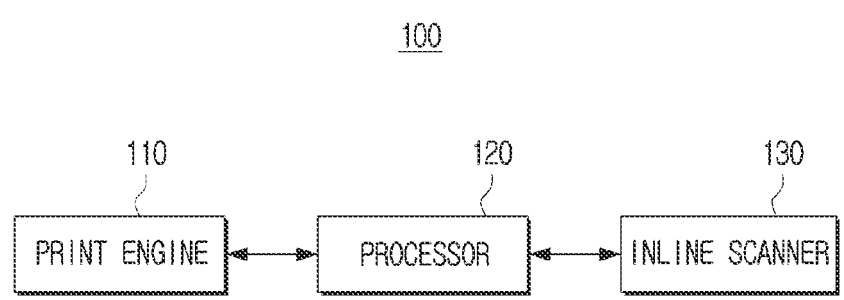
FIG. 1 is a block diagram illustrating an image forming apparatus according to an example.

Hereinafter, various examples will be described with reference to the drawings. The examples described hereinafter may be modified and practiced in various different forms.

In the following description, an expression that a certain component is "connected" to another component includes a case in which the components are "directly connected to each other", and a case in which the components are "connected to each other with another component interposed therebetween". In addition, a certain component that is described to "include" another certain component may further include still another component, rather than excluding it, unless otherwise noted. Each example may be implemented or operated independently or the examples may be implemented or operated in combination.

In the following description, an "image forming job" may refer to any of various jobs relating to an image such as forming of an image or generating, saving, or transmitting of an image file (e.g., copying, printing, scanning, or faxing), and the "job" may refer to the image forming job, and also refer to any process for performing the image forming job.

The "print data" may refer to data converted into a format that is printable by a printer. If a printer supports direct printing, a file itself may be the print data.

The "image forming apparatus" may refer to an apparatus which prints print data generated on a terminal apparatus such as a computer on a recording medium such as paper. Examples of such an image forming apparatus may include a copier, a printer, a facsimile, a scanner, and a multi-function peripheral (MFP) realizing functions of these as one apparatus in combination.

An "external apparatus" may refer to an apparatus which provides information or a service to an image forming apparatus via a network. For example, the external apparatus may be a server, a cloud, a web server, a host apparatus, or a user terminal apparatus. If the external apparatus is a server, examples of the server may include a payment server, a management server, and the like. The service may be provided from a physical server or may be provided from a virtual server (e.g., a cloud server) separated from the physical server. In the following examples, a plurality of external apparatuses may be included. For example, one external apparatus may be a general server for performing an operation for error processing of the image forming apparatus and the other external apparatus may be an artificial intelligence (AI) cloud (e.g., an AI server) which trains errors and solutions and generates a trained error solution model.

In addition, a "user" may refer to a person who manipulates an electronic apparatus by using the electronic apparatus or a device connected to the electronic apparatus in a wired or wireless manner. A "manager" may refer to a person who has authority to access all functions and systems of the electronic apparatus. The "manager" and the "user" may be the same person.

Examples are provided for detecting an error of an image formed on a printing medium (e.g., a sheet of paper) based on print data of an original image and correcting the detected error.

FIG. 1 is a block diagram illustrating an image forming apparatus according to an example.

Referring to FIG. 1, an image forming apparatus 100 may include a print engine 110, a processor 120, and an inline scanner 130.

The print engine 110 may form an image. For example, the print engine 110 may print a print image generated by the processor 120 on a printing medium. The print engine 110 may perform printing by electrophotography, an ink jet method, and the like. In addition, the print engine 110 may be a monochrome print engine capable of printing one color or may be a color print engine capable of color printing.

The inline scanner 130 may be located at an output end of the print engine 110. The inline scanner 130 may scan a printed matter that is printed by the print engine 110 by the control of the processor 120. The processor 120 may obtain information of a print image (i.e., an image) by using the inline scanner 130. For example, the processor 120 may obtain information of the printing medium (e.g., a sheet of paper) and a print image formed on the printing medium.

The information of the print image may include size information of the print image, direction information of the print image, and the like.

The processor 120 may control an operation of the image forming apparatus 100. For example, based on receiving print data for a print job, the processor 120 may obtain information of the print data. For example, the information of the print data may include size information of an original image, direction information of the original image, set printing medium information, printing medium information set in a template form, and the like. The processor 120 may control the print engine 110 so that the received print data is printed.

The processor 120 may detect whether the printed matter (e.g., an image formed on the printing medium) is normally output (i.e., whether an error is present) based on the information of the print data, the information of the printing medium, and information of the image formed on the printing medium. If the printed matter is not normally output, the processor 120 may perform re-output.

For example, if the printed matter is not normally output, the processor 120 may detect whether there is a tray set to match with the set information of the printing medium and perform the print job again by changing a tray to a tray on which a normally-printable printing medium is located.

For example, the processor 120 may compare the size information of the original image and the size information of the print image, and if the pieces of information do not match, the processor 120 may detect whether there is a tray set to match with the set printing medium information. If there is the tray set to match with the set printing medium information, the processor 120 may perform the re-output by changing the tray to the tray set to match with the set printing medium information. Alternatively, the processor 120 may compare the direction information of the original image and the direction information of the print image, and if the pieces of information do not match, the processor 120 may detect whether there is the tray set to match with the set printing medium information. In addition, if there is the tray set to match with the set printing medium information, the processor 120 may perform the re-output by changing the tray to the tray set to match with the set printing medium information. In an example, the processor 120 may compare all pieces of size and direction information and perform the re-output process described above. In addition, the processor 120 may detect whether the information of the print image is printed in the template form. As described above, the information of the print data may include the printing medium information set in the template form. The processor 120 may compare the original image and the print image included in the information of the print data. If the original image matches with the print image, the processor 120 may detect that the printing medium on which the image is formed is not in the template form. The processor 120 may detect whether there is a tray on which the printing medium with the set template form is located, and if there is the tray on which the printing medium with the set template form is located, the processor 120 may perform the re-output by changing the tray to the tray on which the printing medium form with the set template form is located.

Figure 2:
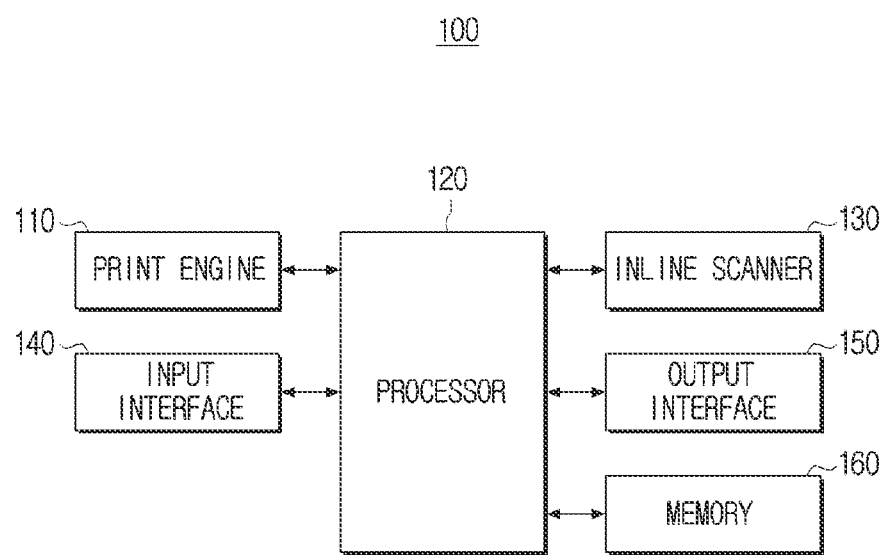
FIG. 2 is a block diagram illustrating an image forming apparatus according to an example.

FIG. 2 is a block diagram illustrating an image forming apparatus according to an example.

Referring to FIG. 2, the image forming apparatus 100 may include the print engine 110, the processor 120, the inline scanner 130, an input interface 140, an output interface 150, and a memory 160. The print engine 110 and the inline scanner 130 perform the same functions as the print engine 110 and the inline scanner 130 of FIG. 1, and therefore the overlapped description will not be repeated. In addition, the processor 120 performs the similar function as the processor 120 of FIG. 1, and therefore the content described in FIG. 1 is not repeated and content related to the examples added to FIG. 2 will be described below.

The input interface 140 may receive a selection of a function and a control command of the corresponding function from the user. The function may include a print function, a copy function, a scan function, a fax transmission function, and the like. The input interface 140 may be referred to as an input unit, an input module, an input device, and the like. In addition, the input interface 140 may receive an input of information of the print data for the print job.

For example, the input interface 140 may include a scanner and receive an input of the information of the print data for the scanned original image. The input interface 140 may include a communication interface. The communication interface may communicate with the external apparatus. For example, the external apparatus may include a server, an AI cloud, a user terminal apparatus, and the like. The communication interface may connect the image forming apparatus 100 to the external apparatus and may be connected via a universal serial bus (USB) port or a wireless communication (e.g., Wi-Fi 802.11a/b/g/n, near field communication (NFC), or Bluetooth) port, in addition to a connection to the external apparatus via a local area network (LAN) or the Internet. The communication interface may be referred to as a communication unit, a communication module, a communication device, a transceiver, or the like. The input interface 140 implemented as the communication interface may receive the information of the print data from the external apparatus. For example, the user may perform a document job on a user terminal apparatus and instruct the image forming apparatus 100 to print. The input interface 140 may receive information on the print data and the print command from the user terminal apparatus.

The output interface 150 may output an error notification based on the occurrence of an error of the print image. For example, the output interface 150 may include a display or a speaker. In a case where the output interface 150 is implemented as a display, the display may display the error notification for the error of the print image. In addition, the display may display a user interface window for receiving a selection of a function supported by the image forming apparatus 100. The display may be a monitor such as a liquid crystal display (LCD), a cathode ray tube (CRT), a light emitting diode (LED), or an organic LED (OLED), and may also be implemented as a touch screen for simultaneously performing a function of the input interface 140. In a case where the output interface 150 is implemented as a speaker, the speaker may output the error notification for the error of the print image as a sound. In addition, the speaker may output state information of the image forming apparatus 100 as a sound.

As described above, the processor 120 may compare size/direction information of the original image with size/direction information of the print image. In an example, in a case where the information of the print data includes the printing medium information set in the template form, the processor 120 may compare the original image with the image of the printed matter. If the information of the original image matches the information of the image of the printed matter, the processor 120 may detect that there is an error in that the image of the printed matter is not printed in the set template form. The processor 120 may detect whether there is a tray set to match with the set printing medium information. If there is no tray set to match with the set printing medium information, the processor 120 may output an error notification notifying that there is an error on the printed matter through the output interface 150 such as a display.

The error of the printed matter may include an error in which an image is formed on a surface of a reusable paper including an image printed in advance (e.g., a paper that has been used before). The processor 120 may compare the original image with the image formed on the printing medium. If the image formed on the printing medium includes a larger amount of data than the original image and the original image does not match with the image formed on the printing medium, the processor 120 may detect that the printing medium on which the image is formed is the reusable paper. In addition, the processor 120 may output an error notification notifying that the printing medium is the reusable paper through the output interface 150.

The memory 160 may store at least one instruction for the image forming apparatus 100. For example, the memory 160 may store various programs (e.g., machine readable instructions) for the image forming apparatus 100 to operate according to various examples of the disclosure. In addition, the memory 160 may store the input print data, the information of the print data, various pieces of setting information, image data of the printed matter, and the like, and may store a module which detects the original image from the print data, a module which detects the print image from the printing medium on which the image is formed, and a module which analyzes the output image.

Figure 3:
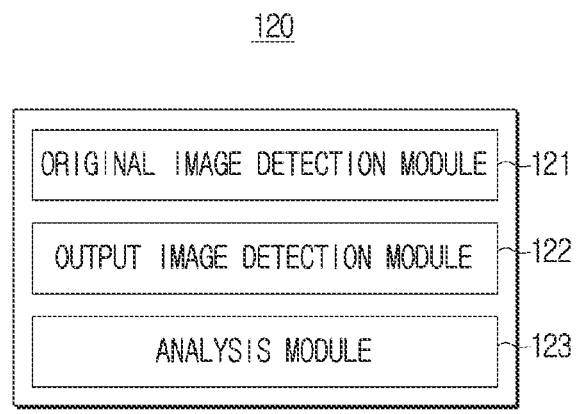
FIG. 3 is a diagram illustrating a processor according to an example.

FIG. 3 is a diagram illustrating a processor according to an example, FIG. 4 is a diagram illustrating information of a printing medium according to an example, and FIG. 5 is a diagram illustrating an option user interface (UI) for setting options for detecting normal output of an output document according to an example. The description will be made with reference to FIGS. 3, 4, and 5.

Referring to FIG. 3, the processor 120 may include an original image detection module 121, an output image detection module 122, and an analysis module 123. The original image detection module 121, the output image detection module 122, and the analysis module 123 may be stored in the memory. As part of the detecting of whether the print image is normally output, the processor 120 may load each module stored in the memory and detect whether the print image is normally output.

Based on the image forming apparatus 100 performing a printing process, the original image detection module 121 may receive information of the print data provided by an external apparatus (e.g., a user terminal apparatus) and store the information in the memory. Alternatively, based on the image forming apparatus 100 performing a scanning process, the original image detection module 121 may detect an image obtained by an input interface (e.g., a scanner) and store the image in the memory.

Referring to FIG. 5, the image forming apparatus 100 may display an option UI for selecting options for detecting whether the output document is normally output. For example, the option UI for selecting options for detecting whether the output document is normally output may include a template detection item, a reusable paper detection item, and a printing medium (e.g., sheet) size (or direction) detection item. Based on one item among the items of the option UI for detecting whether the output document is normally output being selected, the image forming apparatus 100 may operate the inline scanner for outputting the printed matter, and the output image detection module 122 may scan the printed matter and store the printed matter in the memory.

The analysis module 123 may perform the printing medium size (or direction) analysis process and the image analysis process. The analysis module 123 may analyze the original printing medium size and the output printing medium size. The analysis module 123 may analyze the print data obtained by the original image detection module 121 and detect the original printing medium size (or direction). The original printing medium may be an image having a size reduced by a specific margin, and accordingly, the analysis module 123 may analyze the image as an image with a reduced size by considering the margin. Referring to FIG. 4, an example regarding the original printing medium is illustrated. The analysis module 123 may set a range by considering the reduced margin on a standard printing medium and detect a printing medium corresponding to the size. The analysis module 123 may analyze an outline of the print image of the printed matter and detect the size (or direction) of the printing medium that is currently output. The analysis module 123 may compare with the setting of the currently set tray based on the size (or direction) of the detected printing medium. In addition, the analysis module 123 may analyze the image. The analysis module 123 may compare and analyze the original image stored by the original image detection module 121 with the image of the printed matter stored by the output image detection module 122 and detect whether these match with each other.

The processor 120 may detect an error of the printed matter based on the result of the analysis module 123 and detect whether there is a tray capable of performing normal printing. For example, in a case where the image forming apparatus 100 performs the printing in a state where the user selects the template detection item, the processor 120 may detect an error that the printing is not performed in the template form according to the analysis result of the analysis module 123. The processor 120 may detect whether there is a tray designated as the template form among the usable trays. If there is the tray designated as the template form, the processor 120 may perform the printing process again by changing the tray to the designated tray. Alternatively, if there is no tray designated as the template form or the image forming apparatus 100 is unable to address the error situation directly, the processor 120 may output the error notification to the user through the output interface.

Hereinafter, various examples of detecting an error of printed matter will be described.

FIG. 6 is a flowchart illustrating an error detection method of an image according to an example.

Referring to FIG. 6, an image forming apparatus may obtain information of print data and form an image on a printing medium based on the print data in operation S610. For example, in a case where the image forming apparatus performs a printing function, the image forming apparatus may receive the information of the print data from an external apparatus. In a case where the image forming apparatus performs a scanning function, the image forming apparatus may receive input of information of scanned print data. In an example, the information of the print data may include size information of an original image, direction information of the original image, set printing medium information, printing medium information set as a template form, and the like.

The image forming apparatus may obtain print image information of the printing medium on which the image is formed in operation S620. The image forming apparatus may display an option UI for selecting options for detecting whether the output document is normally output. The option UI for selecting options for detecting whether the output document is normally output may include a template detection item, a reusable paper detection item, and a printing medium (e.g., sheet) size (or direction) detection item. Based on an item of the option UI being selected, the image forming apparatus may scan the output document by using the inline scanner and obtain information of the output document. For example, the information of the output document may include a printing medium size of the output document, a printing medium direction of the output document, an image included in the output document, and the like. The information of the image formed on the printing medium may include size information, direction information, and the like of the image.

The image forming apparatus may detect whether the normal output is performed by comparing the information of the print data with the print image information in operation S630. In other words, the image forming apparatus may detect whether there is an error of the image formed on the printing medium based on the obtained information of the print data and printing image information.

For example, the image forming apparatus may compare the size information of the original image with the size information of the print image and detect whether these match with each other. For example, the image forming apparatus may compare the direction information of the original image with the direction information of the print image and detect whether these match with each other. For example, the image forming apparatus may compare both the size and direction information and detect whether these match with each other.

In addition, the image forming apparatus may compare the original image included in the information of the print data with the image formed on the printing medium. In a case where the image formed on the printing medium includes a larger amount of data than the original image and the original image does not match with the image formed on the printing medium, the processor may detect that the printing medium on which the image is formed is reusable paper. In addition, based on the template form being set, the image forming apparatus may compare the original image included in the information of the print data with the image formed on the printing medium. In a case where the original image matches with the image of the printed matter, the image forming apparatus may detect that the printing medium on which the image is formed is not in the template form.

If an output error is detected instead of the normal output, the image forming apparatus may perform re-output in operation S640. For example, the image forming apparatus may detect whether there is a tray set to match with the set printing medium information. If there is the tray set to match with the set printing medium information, the image forming apparatus may perform the re-output by changing the tray. In a case where there is no appropriate tray or the error may not be corrected directly, the image forming apparatus may output the error notification to the user.

Figure 7A:
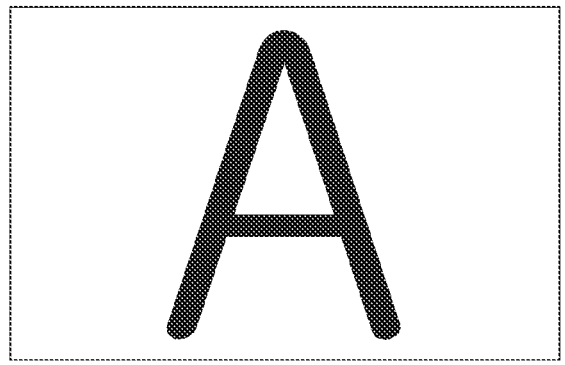
FIGS. 7A and 7B are diagrams illustrating an original image and an output image according to an example.
Figure 7B:
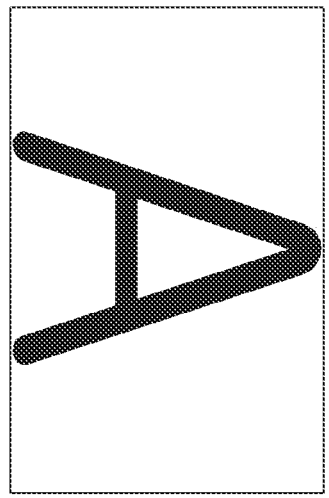
Figure 8:
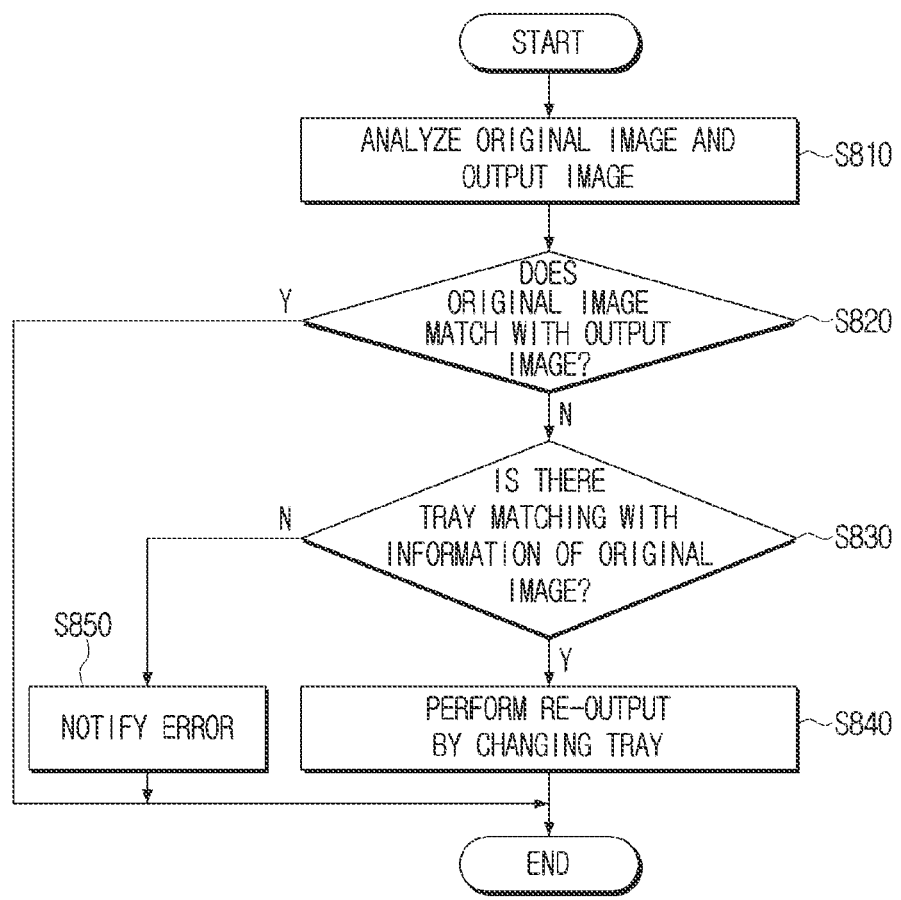
FIG. 8 is a flowchart illustrating a process of detecting an error in which information of an output image does not match with information of an original image according to an example.

FIGS. 7A and 7B are diagrams illustrating an original image and an output image according to an example and FIG. 8 is a flowchart illustrating a process of detecting an error in which information of an output image does not match with information of an original image according to an example. The description will be made with reference to FIGS. 7A, 7B, and 8.

FIG. 7A illustrates an original image. The original image may be an image received by an image forming apparatus from an external apparatus and a scanned image. FIG. 7B illustrates an output image. The output image may include a printing medium size (or direction) and the like based on the original image and may not match with the original image.

The image forming apparatus may analyze the original image and the output image of the print data in operation S810. The image forming apparatus may store the image size (or direction) of the print data and the information of the set printing medium size (or direction). The image forming apparatus may obtain the size (or direction) of the image of the printed matter and the printing medium size information of the printed matter by using the inline scanner. The image forming apparatus may compare and analyze the original image of the print data with the output image of the printed matter.

The image forming apparatus may detect whether the original image matches with the output image in operation S820. If the original image matches with the output image, the image forming apparatus may end the error detection process. If the original image does not match with the output image, the image forming apparatus may detect whether there is a tray matching with the information of the original image in operation S830. In a case where there is the tray matching with the information of the original image, the image forming apparatus may perform the re-output by changing the matching tray in operation S840. If there is no tray matching with the information of the original image, the image forming apparatus may output the error notification in operation S850.

Figure 9A:
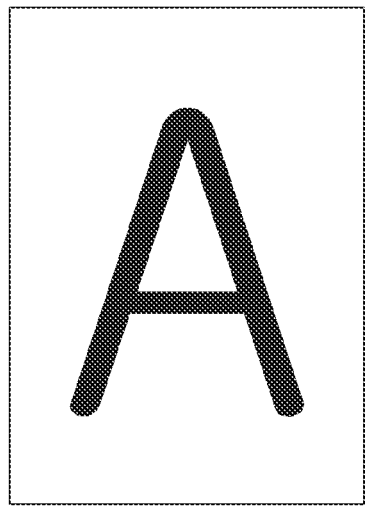
FIGS. 9A and 9B are diagrams illustrating an original image and an output image output on a reusable paper according to an example.
Figure 9B:
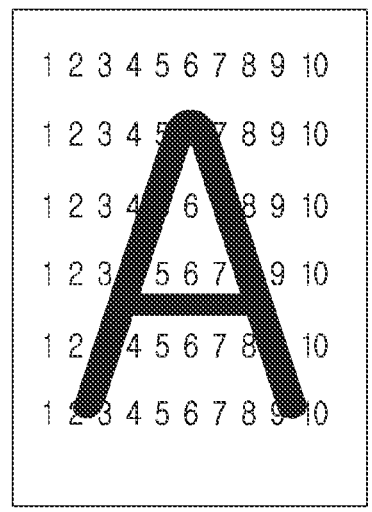
Figure 10:
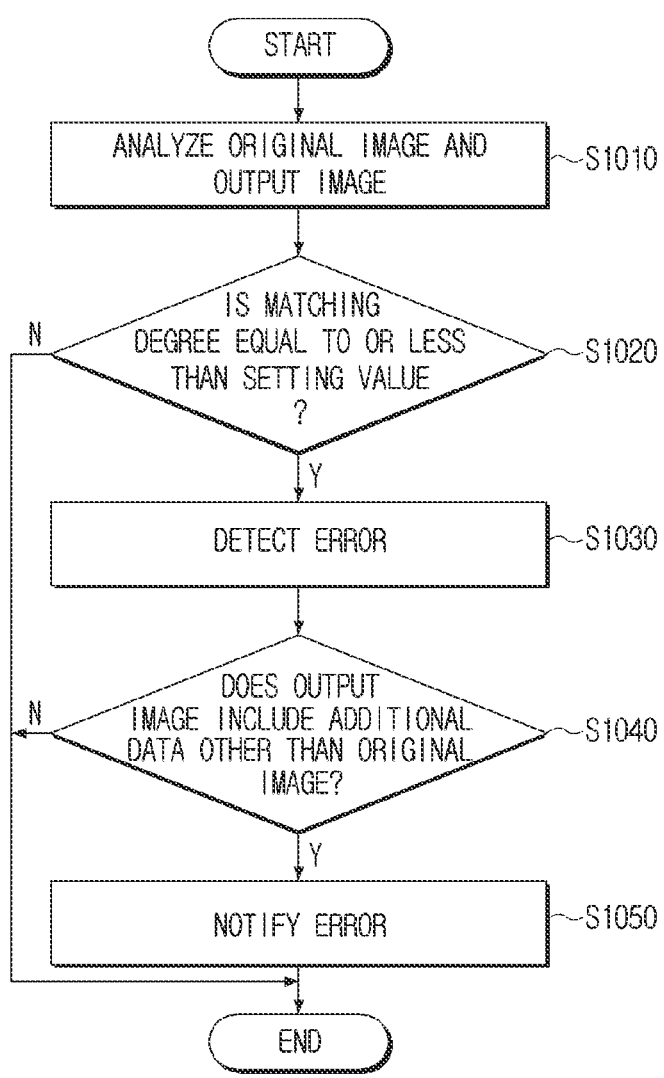
FIG. 10 is a diagram illustrating a process of detecting an error of an output image output on a reusable paper according to an example.

FIGS. 9A and 9B are diagrams illustrating an original image and an output image output on a reusable paper according to an example and FIG. 10 is a diagram illustrating a process of detecting an error of an output image output on a reusable paper according to an example. The description will be made with reference to FIGS. 9A, 9B, and 10.

FIG. 9A illustrates an original image. The original image may be an image received by an image forming apparatus from an external apparatus and a scanned image. FIG. 9B illustrates an output image. The output image may include an error in which the image is formed on a surface of a reusable paper in which an image printed in advance is present.

The image forming apparatus may analyze the original image and the output image in operation S1010. The image forming apparatus may store the image of the print data. The image forming apparatus may obtain the image of the printed matter by using the inline scanner. The image forming apparatus may compare and analyze the original image of the print data and the output image of the printed matter.

The image forming apparatus may detect whether a matching degree is equal to or less than a setting value in operation S1020. If the original image is the same as the output image, the matching degree may be more than the setting value. Referring to FIG. 9B, if the output image includes other data, the matching degree may be equal to or less than the setting value. If the matching degree is more than the setting value, the image forming apparatus may end the error detection process. If the matching degree is equal to or less than the setting value, the image forming apparatus may detect that the normal output is not performed in operation S1030.

The image forming apparatus may detect whether the output image includes additional data other than the original image in operation S1040. If the output image does not include the additional data other than the original image, the image forming apparatus may detect whether it is the reusable paper and end the error detection process. If the output image includes the additional data other than the original image, the image forming apparatus may detect that the output image is formed on the reusable paper.

If the output image is formed on the reusable paper, the image forming apparatus may not address the error directly. Accordingly, the image forming apparatus may output the error notification for notifying the user that the output image is formed on the reusable paper in operation S1050.

Figure 11A:
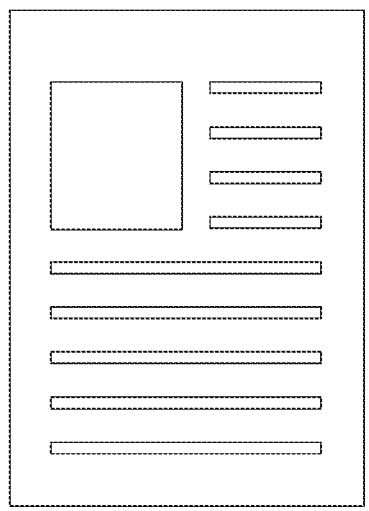
FIGS. 11A to 11C are diagrams illustrating a template form, an original image, and an output image output in the template form according to an example.
Figure 11B:
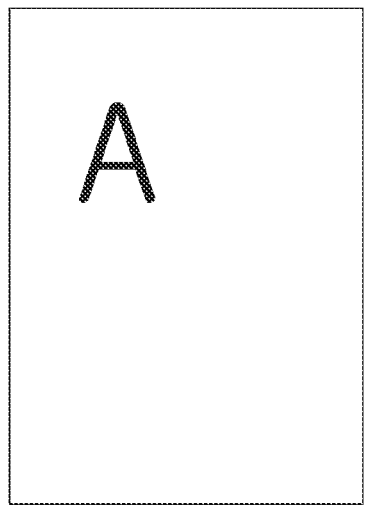
Figure 11C:
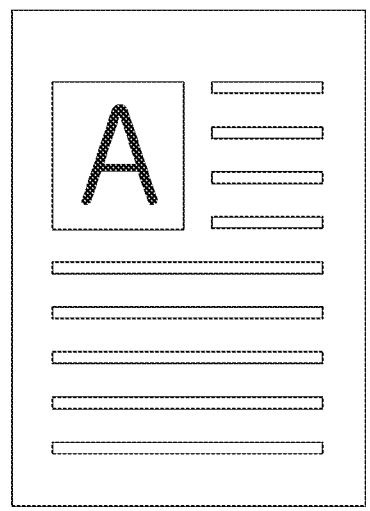
Figure 12:
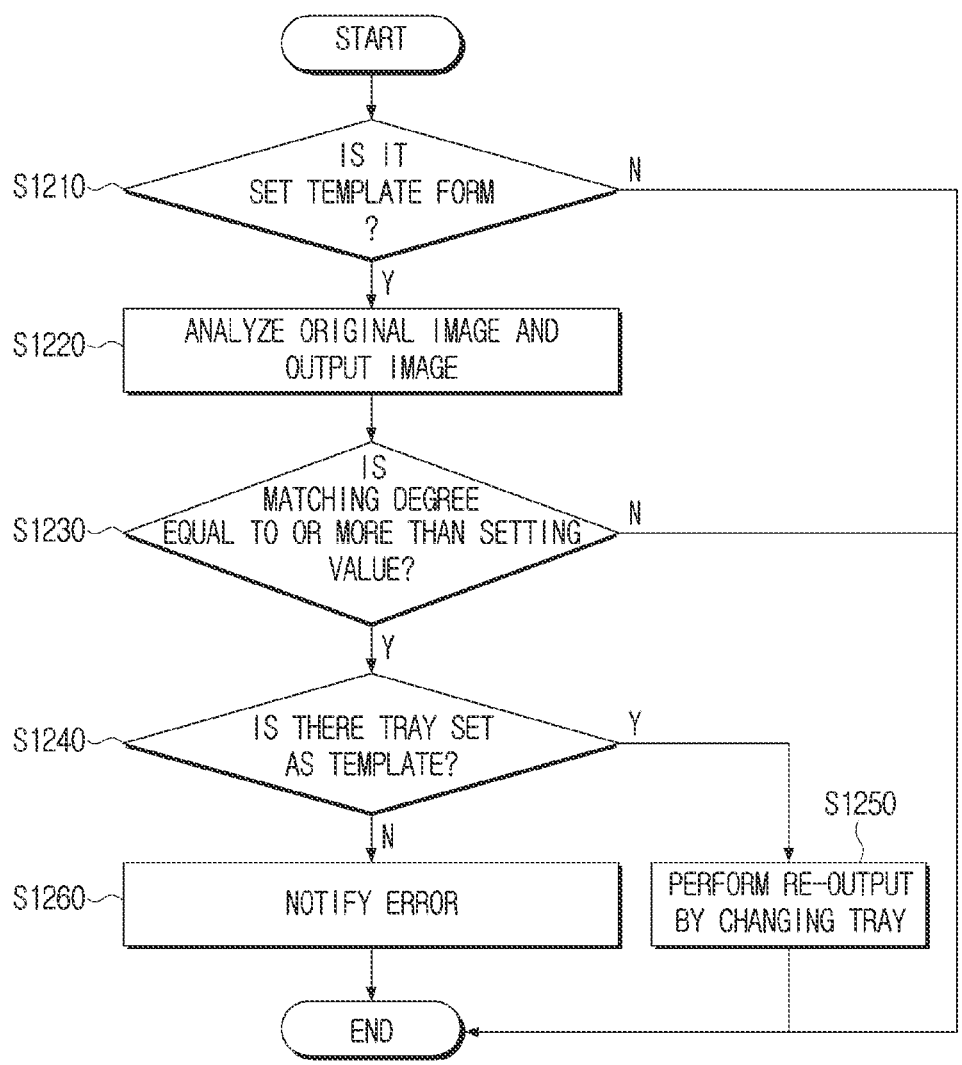
FIG. 12 is a diagram illustrating a process of detecting an error of an output image, based on a template form being set, according to an example.

FIGS. 11A to 11C are diagrams illustrating a template form, an original image, and an output image output in the template form according to an example and FIG. 12 is a diagram illustrating a process of detecting an error of an output image, based on a template form being set, according to an example. The description will be made with reference to FIGS. 11A, 11B, 11C, and 12.

FIG. 11A illustrates an example of a template form and FIG. 11B illustrates an original image. FIG. 11C illustrates an output image in which the image is normally formed in the template form.

The image forming apparatus may detect whether there is a set template form in operation S1210. If there is no set template form, the image forming apparatus may end the error detection process. If there is the set template form, the image forming apparatus may analyze the original image and the output image in operation S1220. The image forming apparatus may store the image of the print data. The image forming apparatus may obtain the image of the printed matter by using the inline scanner. The image forming apparatus may compare and analyze the original image of the print data and the output image of the printed matter.

The image forming apparatus may detect whether the matching degree is equal to or more than the setting value in operation S1230. The original image may be an image with no template form. In addition, the output image that is normally output may be an image including the template form. Accordingly, the matching degrees of the original image and the output image that is normally output may be different. Accordingly, if the matching degree is less than the setting value, the image forming apparatus may detect that the output image is normally output and end the error detection process.

If the matching degree is equal to or more than the setting value, the image forming apparatus may detect that the image is not output in the template form. The image forming apparatus may detect whether there is a tray set as the template in operation S1240.

If there is the tray set as the template, the image forming apparatus may perform the re-output by changing the tray to the set tray in operation S1250. If there is no tray set as the template, the image forming apparatus may output an error notification for notifying the user that the normal output is not performed in operation S1260. Through the above process, the image forming apparatus may detect the error of the output image and address the error directly or notify that the error has occurred to the user.

Hereinabove, various examples of detecting the error of the output image have been described. Hereinafter, example commands stored in a non-transitory computer-readable recording medium will be described.

Figure 13:
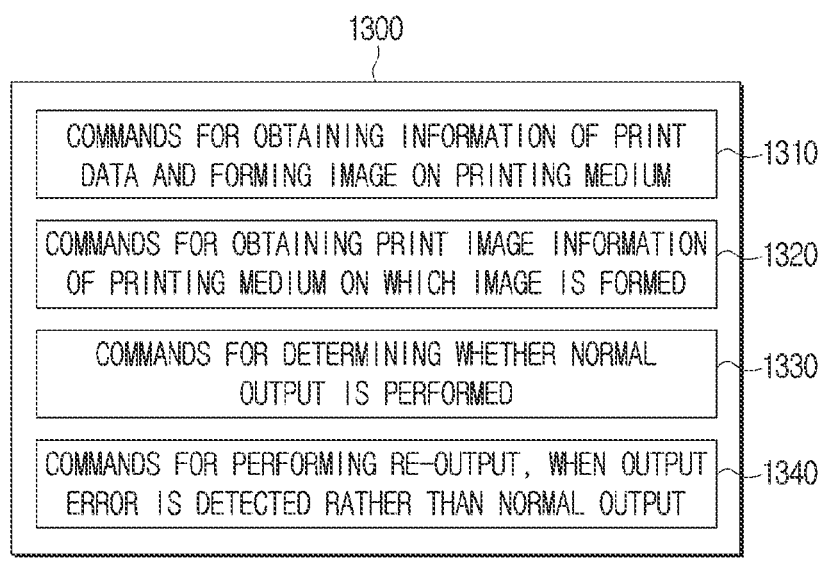
FIG. 13 is a diagram illustrating commands stored in a non-transitory computer-readable recording medium according to an example.

FIG. 13 is a diagram illustrating commands stored in a non-transitory computer-readable recording medium according to an example.

An example error detection process executed by an image forming apparatus as described above may be implemented in a form of the non-transitory computer-readable recording medium storing commands or instructions executable by the computer or the processor. A non-transitory computer-readable recording medium 1300 may store commands related to the operations of the image forming apparatus described above. For example, the non-transitory computer-readable recording medium 1300 may include commands 1310 for obtaining information of print data of a received print job and forming an image on a printing medium based on the print data, commands 1320 for obtaining print image information of a printing medium on which the image is formed, commands 1330 for detecting whether a normal output is performed, and commands 1340 for performing a re-output, based on an error being detected instead of the normal output.

Such a non-transitory computer-readable recording medium may be a read-only memory (ROM), a random-access memory (RAM), a flash memory, CD-ROMs, CD-Rs, CD+Rs, CD-RWs, CD+RWs, DVD-ROMs, DVD-Rs, DVD+Rs, DVD-RWs, DVD+RW, DVD-RAMs, BD-ROMs, BD-Rs, BD-R LTHs, BD-REs, a magnetic tape, a floppy disk, a magneto-optical data storage device, an optical data storage device, a hard disk drive, a solid-state drive (SSD), and any device capable of storing machine readable instructions, related data, data files, and data structures, and providing machine readable instructions, related data, data files, and data structures to a processor or a computer so that the processor or the computer executes the instructions.

While various examples have been shown and described, the disclosure is not limited to the aforementioned examples, and it is apparent that various modifications can be made without departing from the gist of the disclosure as claimed by the appended claims. Also, it is intended that such modifications are not to be interpreted independently from the technical idea or prospect of the disclosure.

What is claimed is:

1. An image forming apparatus comprising:
a print engine;
an inline scanner located at an output end of the print engine; and
a processor,
wherein the processor is to:
obtain information of print data of a received print job including size information of an original image and set printing medium information,
form an image on a printing medium based on the print data by using the print engine,
obtain information of a print image of the printing medium on which the image is formed by using the inline scanner, wherein the information of the print image comprises size information of the print image,
detect whether a normal output is performed by comparing the size information of the original image with the size information of the print image, and
detect an output error in response to the size information of the original image and the size information of the print image not matching and perform re-output.

2. The image forming apparatus according to claim 1, wherein the information of the print data further comprises direction information of an original image and set printing medium information,
wherein the information of the print image further comprises direction information of the print image, and
wherein the processor is to:

compare the direction information of the original image with the direction information of the print image, and detect the output error and perform the re-output in a case where the direction information of the original image and the direction information of the print image do not match with each other.

3. The image forming apparatus according to claim 1, further comprising:

an output interface, wherein the processor, based on the output error being detected, is to:

detect whether there is a tray set to match with set printing medium information of the print data of the received print job, based on there being the tray set to match with the set printing medium information, change a tray to the tray set to match with the set printing medium information and perform the re-output, and based on there being no tray set to match with the set printing medium information, output an error notification through the output interface.

4. The image forming apparatus according to claim 1, further comprising:

an output interface, wherein the processor is to:

compare an original image included in the information of the print data with the print image, detect the printing medium on which the image is formed as a reusable paper based on the original image not matching with the print image, and output an error notification notifying that the printing medium is the reusable paper through the output interface.

5. The image forming apparatus according to claim 1, wherein the information of the print data comprises printing medium information set as a template form, and wherein the processor is to:

compare an original image included in the information of the print data with the print image, detect that the printing medium on which the image is formed is not in the set template form based on the original image matching with the print image, detect whether there is a tray on which the set template form is located, and based on there being the tray on which the set template form is located, change a tray to the tray on which the set template form is located and perform the re-output.

6. The image forming apparatus according to claim 1, further comprising:

an output interface, wherein the information of the print data comprises printing medium information set as a template form, and wherein the processor is to:

compare an original image included in the information of the print data with the print image, based on the original image matching the print image, detect that the printing medium on which the image is formed is not in the set template form and detect whether there is a tray on which the set template form is located, and based on there being no tray on which the set template form is located, output an error notification through the output interface.

7. An error detection method of an image formed on a printing medium, the method comprising:

obtaining information of print data of a received print job and forming an image on a printing medium based on the print data, wherein the information of the print data comprises size information of an original image and set printing medium information;

obtaining information of a print image of the printing medium on which the image is formed by using an inline scanner, wherein the information of the print image comprises size information of the print image;

detecting whether a normal output is performed by comparing the size information of the original image with the size information of the print image, and detecting an output error in response to the size information of the original image and the size information of the print image not matching and performing re-output.

8. The error detection method of an image formed on a printing medium according to claim 7, wherein the information of the print data further comprises direction information of an original image and set printing medium information, wherein the information of the print image further comprises direction information of the print image, and wherein the detecting of whether the normal output is performed comprises comparing the direction information of the original image with the direction information of the print image, and detecting the output error in a case where the direction information of the original image and the direction information of the print image do not match with each other.

9. The error detection method of an image formed on a printing medium according to claim 7, wherein the performing of the re-output comprises:

detecting whether there is a tray set to match with set printing medium information of the print data of the received print job;

based on there being the tray set to match with the set printing medium information, changing a tray to the tray set to match with the set printing medium information and performing the re-output; and based on there being no tray set to match with the set printing medium information, outputting an error notification through an output interface.

10. The error detection method of an image formed on a printing medium according to claim 7, wherein the detecting of whether the normal output is performed comprises:

comparing an original image included in the information of the print data with the print image;

detecting the printing medium on which the image is formed as a reusable paper based on the original image not matching with the print image; and outputting an error notification notifying that the printing medium is the reusable paper.

11. The error detection method of an image formed on a printing medium according to claim 7, wherein the information of the print data comprises printing medium information set as a template form, and wherein the detecting of whether the normal output is performed comprises comparing an original image included in the information of the print data with the print image and detecting that the printing medium on which the image is formed is not in the set template form based on the original image matching with the print image, and wherein the performing of the re-output comprises confirming whether there is a tray on which the set template form is located, and based on there being the tray on which the set template form is located, changing a tray to the tray on which the set template form is located and performing the re-output.

12. The error detection method of an image formed on a printing medium according to claim 7,
wherein the information of the print data comprises printing medium information set as a template form, and
wherein the detecting of whether the normal output is performed comprises:
comparing an original image included in the information of the print data with the print image,
based on the original image matching with the print image, detecting that the printing medium on which the image is formed is not in the set template form;
detecting whether there is a tray on which the set template form is located; and
based on there being no tray on which the set template form is located, outputting an error notification.

13. A non-transitory computer-readable recording medium on which a program for performing an error detection method of an image formed on a printing medium is recorded, the recording medium comprising:
instructions to obtain information of print data of a received print job and forming an image on a printing medium based on the print data, wherein the information of the print data comprises size information of an original image and set printing medium information;
instructions to obtain information of a print image of the printing medium on which the image is formed by using an inline scanner, wherein the information of the print image comprises size information of the print image;
instructions to detect whether a normal output is performed by comparing the size information of the original image with the size information of the print image; and
instructions to detect an output error in response to the size information of the original image and the size information of the print image not matching and perform re-output.

* * * * *